US012732755B2

(12) United States Patent
Qiang et al.

(10) Patent No.: US 12,732,755 B2
(45) Date of Patent: Sep. 8, 2026

(54) ELECTRONIC DEVICE AND TERMINAL

(71) Applicant: Goertek Inc., Weifang (CN)

(72) Inventors: Shousong Qiang, Shandong (CN); Bingtao Hu, Shandong (CN)

(73) Assignee: Goertek Inc., Weifang (CN)

( * ) Notice: Subject to any disclaimer, the term of this patent is extended or adjusted under 35 U.S.C. 154(b) by 457 days.

(21) Appl. No.: 18/270,274

(22) PCT Filed: Aug. 24, 2021

(86) PCT No.: PCT/CN2021/114312

§ 371 (c)(1),
(2) Date: Jun. 29, 2023

(87) PCT Pub. No.: WO2022/160685

PCT Pub. Date: Aug. 4, 2022

(65) Prior Publication Data

US 2024/0107238 A1 Mar. 28, 2024

(30) Foreign Application Priority Data

Jan. 29, 2021 (CN) ......................... 202110133942.7

(51) Int. Cl.
*H04R 9/04* (2006.01)
*H04R 9/06* (2006.01)

(52) U.S. Cl.
CPC ............... *H04R 9/06* (2013.01); *H04R 9/046* (2013.01)

(58) Field of Classification Search
CPC ........... H04R 9/04; H04R 9/041; H04R 9/043
See application file for complete search history.

(56) References Cited

U.S. PATENT DOCUMENTS 6,938,726 B1 * 9/2005 Roark ....................... H04R 9/04 181/171
7,974,434 B2 * 7/2011 Funahashi .............. H04R 9/043 381/403

(Continued)

FOREIGN PATENT DOCUMENTS

CN 201332499 Y 10/2009
CN 207266278 U 4/2018

(Continued)

*Primary Examiner* — Ryan Robinson
(74) *Attorney, Agent, or Firm* — Baker Botts LLP

(57) ABSTRACT

The invention discloses an electronic device and a terminal. The electronic device includes a vibration unit, a bracket, and an elastic support. The first end of the elastic support is connected to the vibration unit, and the second end of the elastic support is connected to the bracket, so as to counterbalance the reciprocating vibration of the vibration unit in a first direction. A cushioning block is provided on the bracket at a position thereof corresponding to the elastic support, and a section of the elastic support close to the second end is installed on the cushioning block. In the present invention, a cushioning block is provided on the bracket so that the second end of the elastic support connected to a pad of the bracket can be installed and supported on the cushioning block. When the vibration unit vibrates, the cushioning block can play a cushioning role, reduce the large displacement stress, eliminate the resonance swing of the elastic support, prevents the elastic support from breaking, and ensures the effectiveness of the assembly between the elastic support and the bracket and high reliability.

17 Claims, 6 Drawing Sheets

(56) References Cited

U.S. PATENT DOCUMENTS

| | | | | |
|---|---|---|---|---|
| 8,054,997 | B2 * | 11/2011 | Taso | H04R 9/045 381/186 |
| 12,302,077 | B2 * | 5/2025 | Rousseau | H04R 1/025 |
| 2005/0254682 | A1 * | 11/2005 | Maekawa | H04R 9/043 381/404 |
| 2007/0274542 | A1 * | 11/2007 | Otomo | H04R 9/043 381/150 |

FOREIGN PATENT DOCUMENTS

| | | | | |
|---|---|---|---|---|
| CN | 111711895 | A | 9/2020 | |
| CN | 212115661 | U | 12/2020 | |
| GB | 1586896 | A * | 3/1981 | H04R 9/045 |

* cited by examiner

ELECTRONIC DEVICE AND TERMINAL

CROSS-REFERENCE TO RELATED APPLICATIONS

This application is a National Stage of International Application No. PCT/CN2021/114312, filed on Aug. 24, 2021, which claims priority to Chinese Patent Application No. 202110133942.7 filed on Jan. 29, 2021, both of which are hereby incorporated by reference in their entireties.

TECHNICAL FIELD

The invention relates to the field of electroacoustic technology, in particular to an electronic device and a terminal.

BACKGROUND

Electronic devices, such as speakers, are important acoustic components in electronic equipment, and are transducers that convert electrical signals into acoustic signals. At present, with the continuous progress and innovation of technology, the structural and design of conventional speakers is also constantly seeking innovation and changes: it not only needs to meet the development trend of miniaturization, but also calls for more attention to optimization of performance and simplification of process as well as cost-efficiency.

In an existing speaker, when assembling a damper and a bracket, a straight-line segment of the damper outside the fulcrum is in contact with a pad of the bracket, and is coated with solder paste; the solder paste is melted by laser welding to fix the damper to the pad. After assembly, the straight-line segment of the damper outside the fulcrum is suspended in the air. Since the speaker works at full-band, resonance occurs at different frequencies, and the damper is prone to break at the fulcrum during its vibration along with the vibration unit, causing assembly failure between the damper and the bracket, and degrading the reliability.

SUMMARY

The present invention main aims at providing an electronic device and a terminal, and intends to solve a problem in the prior art that a damper of a speaker is prone to break at the fulcrum position when following the vibration of the vibration unit.

In order to achieve the above object, the present invention provides an electronic device, which includes a vibration unit, a bracket, and an elastic support. A first end of the elastic support is connected to the vibration unit, and a second end of the elastic support is connected to the bracket, so as to counterbalance the reciprocating vibration of the vibration unit in a first direction.

A cushioning block is provided on the bracket at a position thereof corresponding to the elastic support, on which cushioning block there is installed a section of the elastic support close to the second end.

Preferably, the cushioning block is formed with a perforation, and the section of the elastic support close to the second end passes through and is installed in the perforation.

Preferably, the perforation is a groove structure with one side open and the other side closed, the groove structure is formed on one side of the cushioning block away from the bracket, and an opening of the groove structure faces away from the bracket.

Preferably, the section of the elastic support close to the second end is installed in the groove structure through a flexible cushioning.

Preferably, the flexible cushioning is an adhesive filled in the groove structure.

Preferably, a gap is formed between the section of the elastic support close to the second end and an inner wall of the groove structure, and the gap is filled by the adhesive.

Preferably, the elastic support includes a first installation part, an elastic part and a second installation part connected in sequence, the elastic part is in a polyline structure consisting of straight-lines and/or curved lines, one end of the first installation part away from the elastic part is the first end and one end of the second installation part away from the elastic part is the second end; and the a projective section of the cushioning block facing the elastic part at least partially overlaps with the elastic part.

Preferably, the elastic part includes a third end connected to the first installation part and a fourth end connected to the second installation part, and the elastic part is formed by extending from the third end to the fourth end in straight lines and/or curved lines in the same direction or in different directions; and wherein a central section is provided between the third end and the fourth end, the fourth end is provided right-opposite the central section, and the cushioning block extends from the fourth end to the second end.

Preferably, the first installation part is provided with a first cushioning part, at least part of a structure of the first cushioning part is bent from the first end toward the first direction; and/or, the second installation part is provided with a second cushioning part, the second cushioning part and the elastic part are located in the same horizontal plane, the direction of the plane where the elastic part is located is different from the first direction, and the second cushioning part is bent from the second end toward the elastic part.

Preferably, the second cushioning part is formed as an arc segment, one end of the second cushioning part is connected to the vibration unit, and the other end of the second cushioning part is connected to the second installation part in a smooth transition; or, the second cushioning part includes a connecting segment and an arc segment, the connecting segment is connected to the vibration unit, and the connecting segment is connected to the second installation part in a smooth transition through the arc segment.

Preferably, the bracket is provided with a pad, and the second cushioning part is welded to the pad.

Preferably, a support block is further provided on the bracket, the support block is provided between the pad and the cushioning block, and the support block supports the second cushioning part.

Preferably, the support block is formed with a notch with one side open and the other side closed, the notch is formed on one side of the support block away from the bracket, and an opening of the notch faces away from the bracket; and the second cushioning parts pass through the notch and are supported on a closed side of the notch.

Preferably, the elastic part is a planar structure arranged along the second direction, and the elastic part is located in the same horizontal plane as the first installation part and the second installation part. The first direction and the second direction are perpendicular to each other.

Preferably, the elastic support is formed by winding a wire-like structure; or, the elastic support is formed by stamping a sheet-like structure.

Preferably, a cross-section of a line segment of the elastic support is a closed loop structure formed by curved lines and/or straight lines.

Preferably, the vibration unit includes a diaphragm and a voice coil connected to the diaphragm; the first end is connected to the voice coil;

and/or, the bracket is a housing or a magnetic yoke.

The present invention further provides a terminal, and the terminal includes the electronic device described in any one of the above embodiments.

In the technical solution of the present invention, a cushioning block is provided on the bracket of the electronic device, and the cushioning block is provided at a position close to the second end of the elastic support, and a section of the elastic support close to the second end can be installed on the cushioning block. In the present invention, a cushioning block is provided on the bracket so that the second end of the elastic support connected to a pad of the bracket can be installed and supported on the cushioning block. When the vibration unit vibrates, the cushioning block can play a cushioning role, reduce the large displacement stress, eliminate the resonance swing of the elastic support, prevents the elastic support from breaking, and ensures the effectiveness of the assembly between the elastic support and the bracket and high reliability.

BRIEF DESCRIPTION OF THE DRAWINGS

In order to more clearly illustrate technical solutions in the embodiments of the present invention or the prior art, the following will briefly introduce the drawings that need to be used in the description of the embodiments or the prior art. Obviously, the accompanying drawings in the following description are only some embodiments of the present invention. For those skilled in the art, other drawings can also be obtained according to the structures shown in these drawings without creative effort.

EXPLANATION OF REFERENCE NUMBERS

| reference number | name | reference number | name |
|---|---|---|---|
| 10 | elastic support | 20 | vibration unit |
| 101 | first end | 21 | voice coil |
| 102 | second end | 211 | bobbin |
| 11 | first installation part | 212 | voice coil wire |
| 12 | second installation part | 30 | bracket |
| 13 | elastic part | 40 | pad |
| 131 | third end | 50 | elastic group |
| 132 | fourth end | 60 | cushioning block |
| 14 | first cushioning part | 61 | groove structure |
| 15 | second cushioning part | 70 | support block |
| 151 | arc segment | 71 | notch |
| 152 | connecting segment | | |

The implement of the purpose, functional characteristics and advantages of the present invention will be further described in conjunction with the embodiments and with reference to the accompanying drawings.

DETAILED DESCRIPTION

The following will clearly and completely describe the technical solutions in the embodiments of the present invention with reference to the accompanying drawings in the embodiments of the present invention. Obviously, the described embodiments are only a part of the embodiments of the present invention, not all of them. Based on the embodiments of the present invention, all other embodiments obtained by persons of ordinary skill in the art without creative efforts fall within the protective scope of the present invention.

It should be noted that if there are directional indications (such as up, down, left, right, front, back . . . ) in the embodiment of the present invention, the directional indications are only used to explain the relative position relationship, motion situation, etc. between various components in a specific posture (as shown in the accompanying drawings). If the specific posture changes, the directional indication will also change accordingly.

In addition, if there are descriptions involving “first”, “second” and so on in the embodiments of the present invention, the descriptions of “first”, “second” and so on are only for descriptive purposes, and should not be interpreted as indicating or implying its relative importance or implicitly indicates the number of technical features indicated. Thus, the features defined as “first” and “second” may explicitly or implicitly include at least one of these features. In addition, the technical solutions of the various embodiments can be combined with each other, but it must be based on that can be realized by those skilled in the art. When the combination of technical solutions is contradictory or cannot be realized, it should be considered that the combination of technical solutions does not exist, nor within the protective scope of the present invention.

Figure 4:
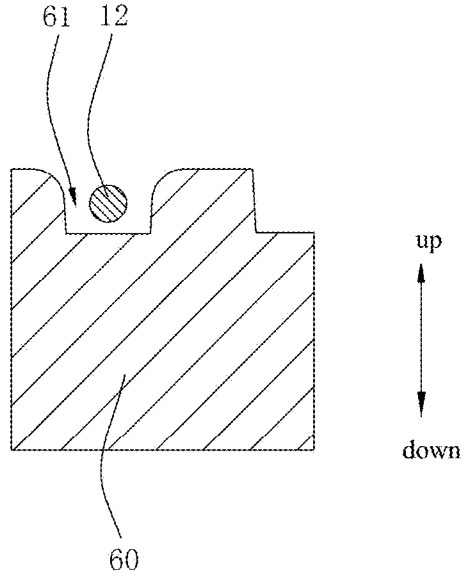
FIG. 4 is a cross-sectional view of a cushioning block and an elastic support in an electronic device according to an embodiment of the present invention.
Figure 5:
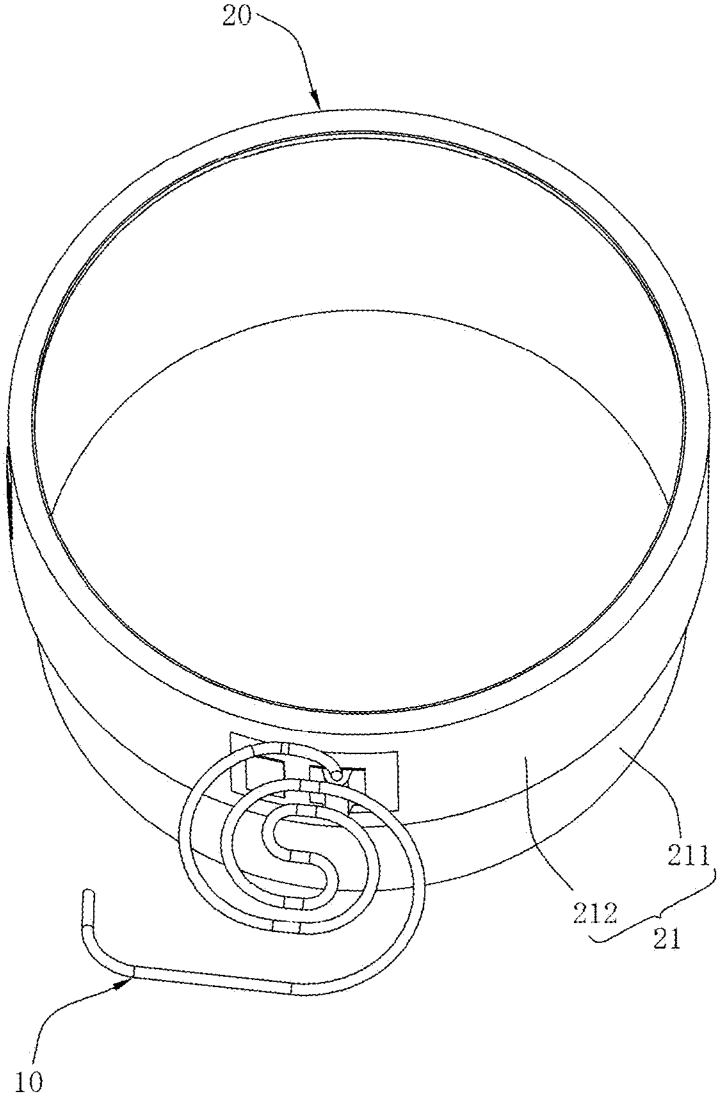
FIG. 5 is a perspective view of an elastic support and a voice coil in an electronic device according to an embodiment of the present invention.
Figure 6:
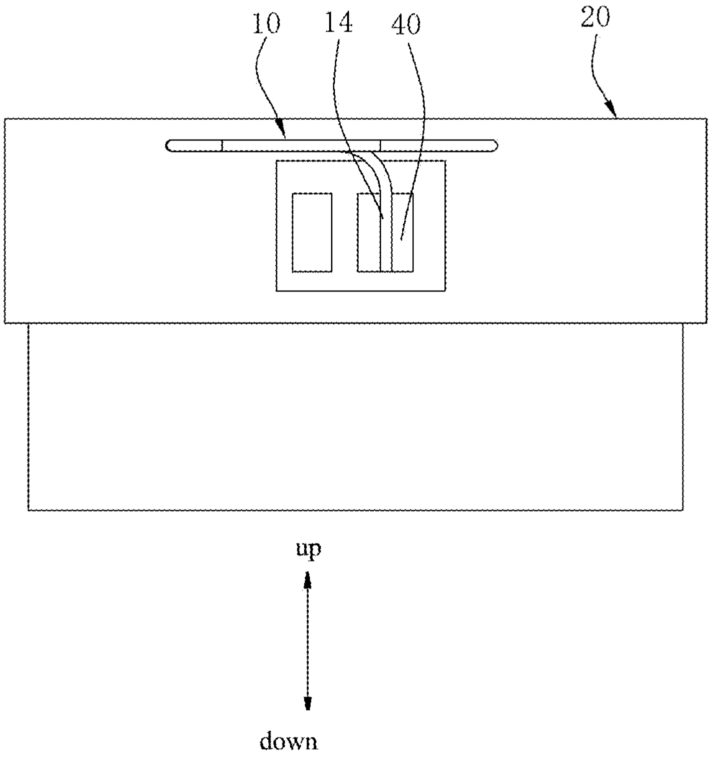
FIG. 6 is a front view of an elastic support and a voice coil in an electronic device according to an embodiment of the present invention.
Figure 7:
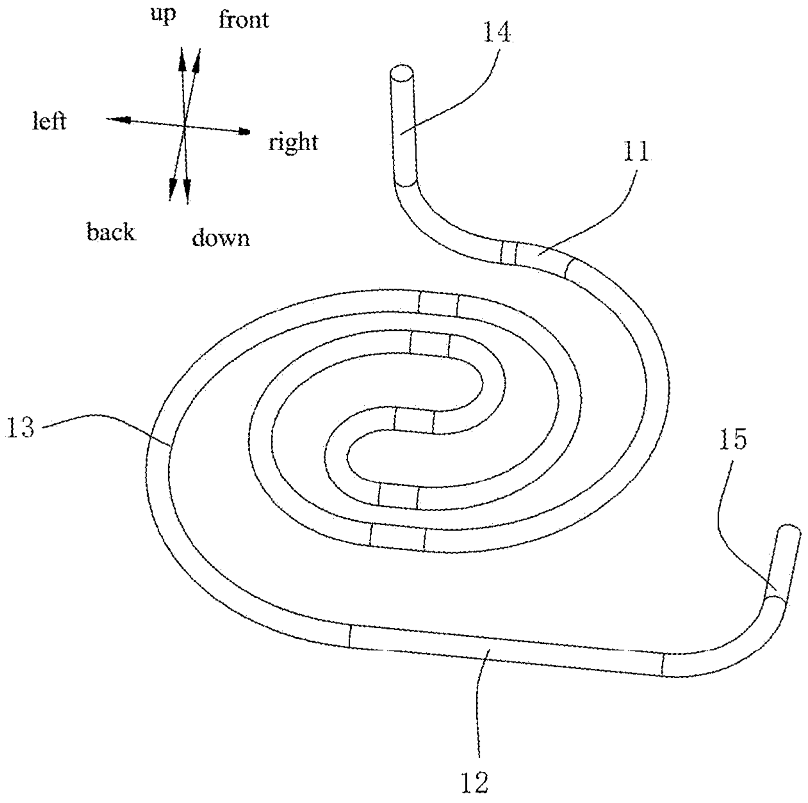
FIG. 7 is a perspective view of an elastic support in an electronic device according to an embodiment of the present invention.

The descriptions of orientations such as “up”, “down”, “front”, “rear”, “left”, and “right” in the present invention are based on the orientations shown in FIG. 4, FIG. 6 and FIG. 7, and are only used for explain the relative position relationship between the various components in the postures shown in FIG. 4, FIG. 6 and FIG. 7. If the specific posture changes, the directional indication will also change accordingly.

The invention provides an elastic support.

As shown in FIGS. 1 to 11, an electronic device includes a vibration unit 20, a bracket 30 and an elastic support 10. A first end 101 of the elastic support 10 is connected to the vibration unit 20, and a second end 102 of the elastic support 10 is connected to the bracket 30 connection, so as to counterbalance the reciprocating vibration of the vibration unit 20 in the first direction. A cushioning block 60 is provided on the bracket 30 at a position thereof corresponding to the elastic support 10. A section of the elastic support 10 close to the second end 102 is installed on the cushioning block 60.

The elastic support 10 of the embodiment is applied to electronic devices such as a sound producing device, a motor, or a multifunctional vibrating device. For example, the elastic support 10 is applied to a sound producing device in the embodiment. The electronic device includes the elastic support 10 and the vibration unit 20. The elastic support 10 is used to balance the vibration of the vibration unit 20 along the first direction, and the first direction of the embodiment is the up and down direction shown in FIG. 4, FIG. 6 and FIG. 7. That is to say, the elastic support 10 is used to balance the vibration of the vibration unit 20 in the up and down direction. The electronic device further includes the bracket 30. In one embodiment, the vibration unit 20 includes a diaphragm and a voice coil 21 connected to the diaphragm. The first end 101 and the second end 102 of the elastic support 10 are respectively connected to the voice coil 21 and the bracket 30 respectively, and/or, the bracket 30 is a housing or a magnetic yoke.

It can be understood that after the vibration unit 20 receives an electrical signal, it can vibrate in the up and down direction in a housing of the electronic device. The up and down direction is based on the directions shown in FIG. 4, FIG. 6 and FIG. 7. The vibration direction of the vibration unit 20 is represented by a vertical direction or the up-down direction, and the direction perpendicular to the vibration of the vibration unit 20 is represented by a horizontal direction. In one embodiment, the first end 101 of the elastic support 10 is connected to the voice coil 21. Specifically, the voice coil 21 includes a bobbin 211 and a voice coil wire 212 wound around the bobbin 211. The first end 101 can be connected to the bobbin 211, and can also be connected to the voice coil wire 212. The second end 102 of the elastic support 10 is connected to the housing to realize the assembly of the voice coil 21, the elastic support 10 and the housing. In another embodiment, the first end 101 of the elastic support 10 is connected to the voice coil 21, and the second end 102 is connected to the magnetic yoke.

In the electronic device, the vibration unit 20 includes a diaphragm and a voice coil 21 connected to the diaphragm. The voice coil 21 is usually formed by winding a metal wire. When the voice coil 21 receives the electrical signal, the voice coil 21 vibrates up and down in the magnetic field of the electronic device under the action of Ampere's force. The vibration direction of the voice coil 21 is represented by the vertical direction or the up and down direction, and the direction perpendicular to the vibration of the voice coil 21 is represented by the left and right direction or the horizontal direction. Since the diaphragm and the voice coil 21 are fixed and integrated by bonding or other manners, when the voice coil 21 vibrates up and down according to the electrical signal, it will also drive the diaphragm to vibrate, generating sound waves.

Because the magnetic field of the electronic device is only relatively uniform rather than absolutely uniform, the position of the voice coil 21 will change during the vibration process of the voice coil 21, and the magnetic field lines located on the upper side of the magnetic gap of the electronic device are arc-shaped lines. Therefore, Ampere's force applied to the voice coil 21 is not only in the vertical direction, but also includes ampere force in other directions, which causes the voice coil 21 to be prone to polarization in non-vertical direction during the vibration process, the vibration of the diaphragm will be influenced.

In order to prevent the above-mentioned polarization, the elastic support 10 connecting the voice coil 21 and the bracket 30 is provided to be used for centering and supporting the voice coil 21 to facilitate polarization thereof, that is, the voice coil 21 is ensured to vibrate along the vibration direction in the magnetic gap of the electronic device. In one embodiment, the elastic support 10 is a planar spring.

In one embodiment, the bracket 30 is a housing or a magnetic yoke. Since the housing can be used to carry a unit of the sound producing device, the bracket 30 is provided as a housing so as to facilitate the fixing of the side of the elastic support 10 away from the vibration unit 20, and improve the centering support performance of the elastic support 10. Since most of the vibrating unit 20 is close to the magnetic gap of the electronic device, which is close to the magnetic yoke, and the side of the elastic support 10 away from the vibrating unit 20 is connected to the magnetic yoke, the setting distance of the elastic support 10 can be reduced and the centering support performance of the elastic support 10 can be improved. It should be noted that, as mentioned above, the fixing of the elastic support 10 in the embodiment includes various combinations: the first end 101 and the second end 102 of the elastic support 10 are respectively connected to the voice coil 21 and the housing, or the first end 101 and the second end 102 of the elastic support 10 are respectively connected to the voice coil 21 and the magnetic yoke, both of which can better ensure the centering support performance of the elastic support 10.

In the embodiment, a cushioning block 60 is provided on the bracket 30 corresponding to the position of the elastic support 10, and the section of the elastic support 10 close to its second end 102 is installed on the cushioning block 60. Specifically, as shown in FIGS. 1 to 4, the cushioning block 60 is provided on the bracket 30, and the cushioning block 60 is arranged at a position close to the second end 102 of the elastic support 10, and the section of the elastic support 10 close to its second end 102 is installed on the cushioning block 60. In the embodiment, the cushioning block 60 is provided on the bracket 30, so that the second end 102 of the elastic support 10 connected to the pad 40 of the bracket 30 can be installed and supported on the cushioning block 60. When the vibration unit 20 vibrates, the cushioning block 60 can play a cushioning role, reduce the large displacement stress of the elastic support 10, eliminate the resonance swing of the elastic support 10, prevent the elastic support 10 from breaking, and ensure high effectiveness and reliability of the assembly between the elastic support 10 and the bracket 30.

Specifically, the cushioning block 60 of the embodiment is formed with a perforation, and the section of the elastic support 10 close to its second end 102 passes through the perforation and is installed in the perforation. Further, the perforation is a groove structure 61, one side of the perforation opens and the other side is closed. The groove structure 61 is formed on one side of the cushioning block 60 away from the bracket 30, and the opening of the groove structure 61 faces away from the bracket 30. As shown in FIGS. 1 to 4, the opening of the groove structure 61 is provided upwards, that is, the opening side of the groove structure 61 is the upper side, and the closed side is the lower side. The section of the elastic support 10 close to its second end 102 can pass through the groove structure 61, and the groove structure 61 guides and supports the elastic support 10 to eliminate the resonance swing of the elastic support 10.

Furthermore, the section of the elastic support 10 close to its second end 102 is installed in the groove structure 61 by means of a flexible cushioning. The flexible cushioning is an adhesive filled in the groove structure 61. In one embodiment, the adhesive can be silica gel or rubber in the prior art. Since silica gel or rubber is flexible, it can cushion and protect the elastic support 10 passing through the groove structure 61, and further eliminate the resonance swing of the elastic support 10.

As shown in FIG. 4, a gap is formed between the section of the elastic support 10 close to its second end 102 and the inner wall of the groove structure 61, and the gap is filled by the adhesive. It can be understood that the part of the elastic support 10 passing through the groove structure 61 is suspended in the groove structure 61, and there is a gap between the elastic support 10 and the inside of the groove structure 61. The adhesive can fill the whole gap, so as to forms all-round cushioning and protecting effects on the periphery of the elastic support 10.

In the embodiment, the elastic support 10 includes a first installation part 11, an elastic part 13 and a second installation part 12 connected in sequence. The elastic part 13 is in a polyline structure consisting of straight-lines and/or curved lines. One end of the first installation part 11 away from the elastic part 13 is the first end 101, and one end of the second installation part 12 away from the elastic part 13 is the second end 102. A projective section of the cushioning block 60 facing the elastic part 13 at least partially overlaps with the elastic part 13.

Specifically, the elastic support 10 can be a polyline structure such as a line, a narrow strip, or a sheet formed by integral stamping of a metal plate, or a polyline structure formed by winding a single-strand metal wire, or a polyline structure by winding a double-strand metal wire, etc. The shape of the elastic part 13 can be a polygonal spiral structure formed by bending and extending a line-like structure, specifically, it can be a quadrangle, pentagon, hexagon, etc., or a circular or elliptical structure, or a structure combining straight lines and curved lines. For example, every bend in the elastic part 13 is a bent line segment, one part of the bent line segment is a straight line, and the other part is a curved line, which can specifically be a shape in which curved lines and straight lines are alternately connected. It should be noted that, the alternation here is not limited to one-to-one alternation, it can also be the alternation of one-to-many, many-to-many.

The setting of the elastic support 10 in the embodiment forms a constraint on the vibration unit 20 in the horizontal direction when the vibration unit 20 vibrates vertically, which can restrain the polarization of the vibration unit 20, and the elastic support 10 follows the vibration unit 20 to displace in the vertical direction. Compared with the existing damper of a corrugated sheet-shape, the elastic part 13 of the elastic support 10 in the embodiment extends in straight lines and/or curved lines, which can decrease the stress concentration of the elastic part 13, increase fatigue strength and reduce the risk of breaking the elastic support 10. Accordingly, during the vertical displacement of the elastic support 10 following the vibration unit 20, the elastic deformation of the elastic part 13 is large enough. Even in the case of a large vibration displacement of the vibration unit 20, the compliance of the elastic support 10 remains good, can provide sufficient displacement, does not influence the vibration of the vibration unit 20, and optimizes performance of products. Moreover, the elastic support 10 of the embodiment is formed by bending and extending a line-like structure as a whole, which is simple and convenient to be manufactured, simplifies the manufacturing process, has high manufacturing efficiency, and reduces the manufacturing cost. And, the elastic support 10 of the embodiment does not increase the height of the electronic device in the vertical direction, occupying a small space, and is conducive to miniaturization of the product.

In the embodiment, the projective section of the cushioning block 60 facing the elastic part 13 at least partially overlaps with the elastic part 13. It can be understood that the elastic part 13 is a main structure of the elastic support 10, and the projective section of the cushioning block 60 facing the elastic part 13 at least partially overlaps with the elastic part 13, and the cushioning block 60 can play a cushioning role in the main structure of the elastic support 10, so as to reduce the large displacement stress of the overall elastic support 10, eliminates the resonance swing of the elastic support 10, and prevents the elastic support 10 from breaking. In one embodiment, the cushioning block 60 is provided right-opposite to the elastic part 13, and the projective section of the cushioning block 60 facing the elastic part 13 can fully overlap with the elastic part 13 to eliminate the resonance swing of the elastic support 10 to the greatest extent.

In the embodiment, the elastic part 13 includes a third end 131 connected to the first installation part 11, and a fourth end 132 connected to the second installation part 12. The elastic part 13 is formed by extending from the third end 131 to the fourth end 132 in straight lines and/or curved lines in the same direction or in different directions. A central section is provided between the third end 131 and the fourth end 132, and the fourth end 132 is provided right-opposite the central section. The cushioning block 60 extends from the fourth end 132 to the second end 102.

As shown in FIGS. 1 to 11, the elastic support 10 is formed by bending and extending a line-like structure which is narrow and elongated as a whole. The elastic part 13 can be in a spiral structure, and is formed by extending spirally from its third end 131 to the central section clockwise, and then extending from the central section to the fourth end 132 counterclockwise. The elastic part 13 can also be in a spiral-like structure which is square, and is formed by extending from its third end 131 to the central section along a straight line and a curved line respectively, and then extending from the central section to the fourth end 132 along a curved line and a straight line respectively. The elastic part 13 can also be other structures formed by bending and extending a narrow and long line-like structure which is narrow and elongated. The structural and shape of the elastic part 13 can be provided according to actual requirements. The elastic support 10 of the present invention does not limit the structure of the elastic part 13. Compared with the existing damper of a corrugated sheet-shape, the elastic support 10 of the embodiment is formed by bending and extending a line-like structure which is narrow and elongated as a whole, and can decrease the stress concentration of the elastic support 10, increase fatigue strength and reduce the risk of breaking the elastic support 10. The compliance of the elastic support 10 remains good without influencing the vibration of the vibration unit 20.

In the embodiment, the cross-section of the line segment of the elastic support 10 is a closed loop structure formed by curved lines and/or straight lines. It can be understood that the cross-section of the line segment of the elastic support 10 is the cross-section of the bent segment of the line-like structure. For example, every bending in the elastic part 13 is a bent segment, and the cross-section of the bent segment is the cross-section of the elastic support 10. The cross-section of the line segment of the elastic support 10 in the embodiment can be circular, oval, square, rectangular, race-track-shaped or a near-rectangle shaped, etc. The elastic support 10 can be formed directly by winding a circular or square wire, or after winding a wire, the cross-section of the wire is stamped into an oval or rectangular shape, so that the radial force of the elastic support 10 is significantly increased. Even in the case of a large displacement of the vibration unit 20 at low frequencies, a good listening effect can be ensured.

In the elastic support 10, the fourth end 132 of the elastic part 13 is arranged right-opposite the central section, and the cushioning block 60 extends from the fourth end 132 to the second end 102, so that the cushioning block 60 has a sufficient length. Accordingly, the length of the section the elastic support 10 close to its second end 102 and supported on the cushioning block 60 is extended, thereby improving the cushioning effect on the elastic support 10.

In the embodiment, the first installation part 11 is provided with a first cushioning part 14, at least part of the structure of the first cushioning part 14 is bent from the first end 101 toward the first direction; and/or, the second installation part 12 is provided with a second cushioning part 15, the second cushioning part 15 and the elastic part 13 are located in the same horizontal plane. The direction of the plane where the elastic part 13 is located is different from the first direction, and the second cushioning part 15 is bent from the second end 102 toward or away from the elastic part 13.

In the embodiment, the plane where the elastic part 13 located can be a horizontal plane, and can also be other directions different from the vertical direction. For example, the plane where the elastic part 13 of the embodiment located is a horizontal plane. The second cushioning part 15 and the elastic part 13 are located in the same horizontal plane, that is, the second cushioning part 15 is arranged horizontally, and the second cushioning part 15 is bent toward or away from the elastic part 13.

It can be understood that when the elastic support 10 is assembled with the voice coil 21 and the bracket 30 such as the housing or magnetic yoke, the first cushioning part 14 of the elastic support 10 can be in contact with a pad 40 of the voice coil 21, and coated with solder paste. The solder paste is melted by laser welding to fix the elastic support 10 and the pad 40 of the voice coil 21, to realize the assembly of the elastic support 10 and the voice coil 21. And/or, the bracket 30 is provided with a pad 40, and the second cushioning part 15 is welded to the pad 40. Specifically, the second cushioning part 15 of the elastic support 10 can be in contact with the pad 40 of the bracket 30 and coated with solder paste. The solder paste is melted by laser welding to fix the elastic support 10 and the pad 40 of the bracket 30, to realize the assembly of the elastic support 10 and the voice coil 21. In the elastic support 10 of the embodiment, the bending direction of at least part of the structure of the first cushioning part 14 is consistent with the vibration direction of the vibration unit 20, that is, at least part of the structure of the first cushioning part 14 is bent along the vertical direction, so that at least part of the structure of the first cushioning part 14 is not influenced by the vertical vibration of the vibration unit 20. Therefore, this part of the structure will not be pulled by the rotational force, the fatigue resistance is good, and the solder joint between the elastic support 10 and the pad 40 is not prone to break and fall off. The assembly effectiveness between the elastic support 10 and the voice coil 21 or the bracket 30 and the high reliability can be ensured. In the elastic support 10 of the embodiment, the connection between the first installation part 11 and the first cushioning part 14 transitions smoothly, and the stress concentration can be reduced to ensure that the elastic support 10 will not break.

The elastic part 13 is located in a middle section between the first installation part 11 and the second installation part 12, and the second cushioning part 15 of the embodiment is bent toward or away from the elastic part 13, that is, the second cushioning part 15 is bent toward or away from the middle section of the elastic support 10. Preferably, the second cushioning part 15 is bent toward the middle section of the elastic support 10, not only the contact section between the second cushioning part 15 and the pad 40 of the bracket 30 are increased, but also the rotational force exerted on the elastic support 10 during the vibration of the vibration unit 20 can be suppressed. In addition, the fatigue resistance is good, the solder joint between the elastic support 10 and the pad 40 of the bracket 30 is not prone to break and fall off, the assembly effectiveness between the elastic support 10 and the bracket 30 can be ensured, and the reliability is high.

Figure 10:
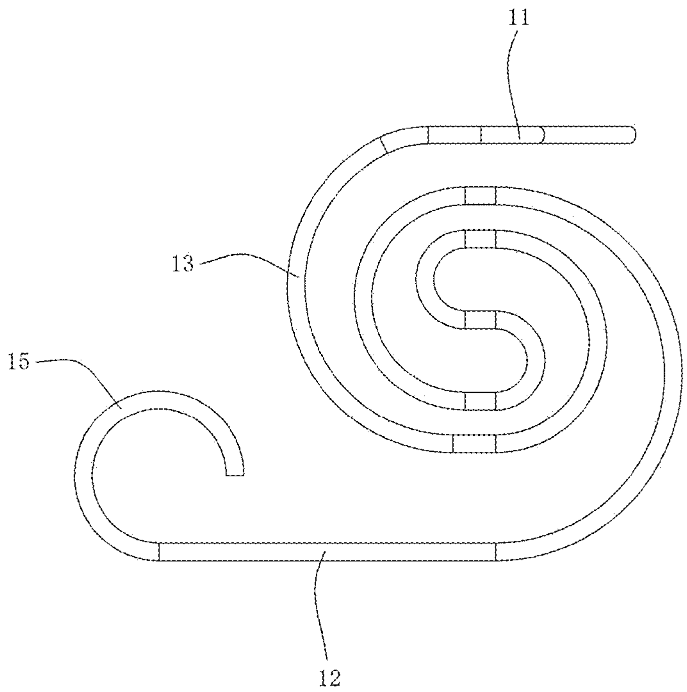
FIG. 10 is a plan view of an elastic support in an electronic device according to yet another embodiment of the present invention.

As shown in FIG. 10, in one embodiment, the second cushioning part 15 is in the shape of an arc segment. One end of the second cushioning part 15 is connected to the vibration unit 20, and the other end of the second cushioning part 15 is connected to the second installation part 12 in a smooth transition. For Example, in the embodiment, the second cushioning part 15 is connected to the bracket **3*e*. The second cushioning part 15 is in the shape of an arc segment, one end of the arc segment is connected to the bracket 30, and the other end of the arc segment is connected to the second installation part 12 in a smooth transition. As such, the stress concentration can be reduced to ensure that the elastic support 10** will not break.

Figure 11:
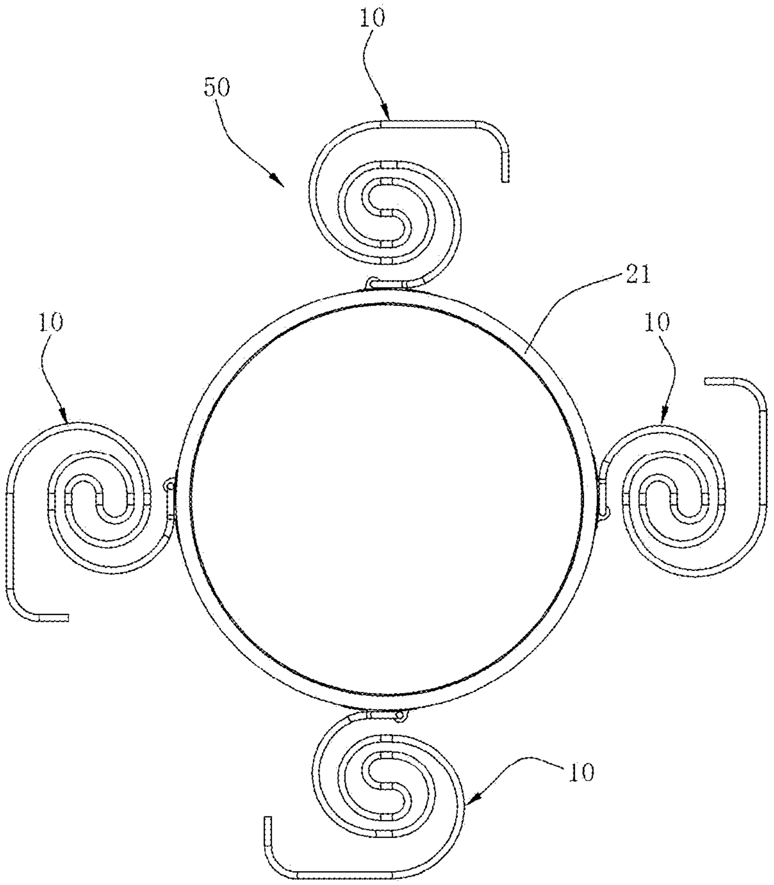
FIG. 11 is a top view of an electronic device of the present invention.

Further, the second cushioning part 15 is in the shape of an arc segment with a central angle greater than or equal to 90°; and/or, a length of the second cushioning part 15 is greater than or equal to 1.5 mm. As shown in FIG. 11, the second cushioning part 15 can be in the shape of a ¾ arc, which can greatly reduce the impact of the vertical vibration of the vibration unit 20 on the elastic support 10. In addition, the length of the second cushioning part 15 is greater than or equal to 1.5 mm, so that the second cushioning part 15 has sufficient length to be welded and fixed with the pad 40.

Figure 8:
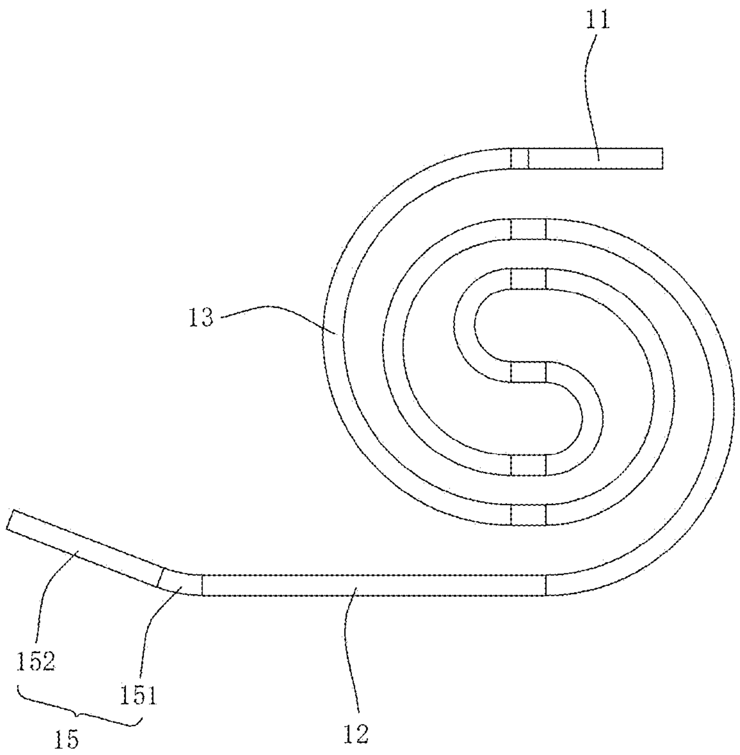
FIG. 8 is a plan view of an elastic support in an electronic device according to an embodiment of the present invention.
Figure 9:
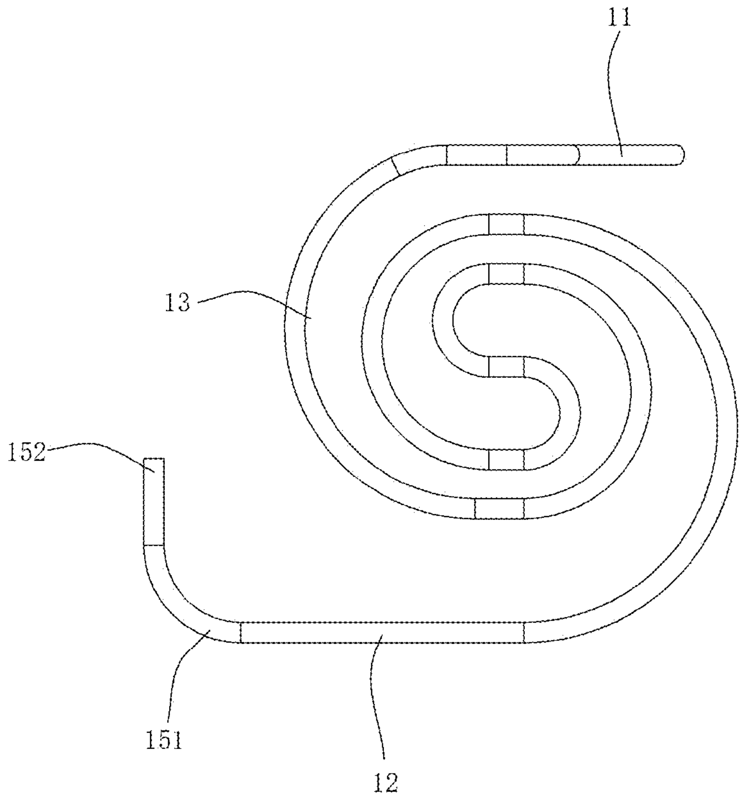
FIG. 9 is a plan view of an elastic support in an electronic device according to another embodiment of the present invention.

As shown in FIGS. 8 and 9, in another embodiment, the second cushioning part 15 includes a connecting segment 152 and an arc segment 151. The connecting segment 152 is connected to the vibration unit 20, and the connecting segment 152 is connected to the second installation part 12 in a smooth transition through the arc segment 151. In the embodiment, the second cushioning part 15 is connected onto the bracket 30. The connecting segment 152 of the second cushioning part 15 is connected onto the bracket 30, and the connecting segment 152 is connected to the second installation part 12 in a smooth transition through the arc segment 151. The arc segment 151 acts as a cushioning between the second installation part 12 and the connecting segment 152 to avoid stress concentration.

Further, the arc segment 151 is a circular arc segment with the inner concave surface facing the elastic part 13. The connecting segment 152 is a straight line segment, and the included angle between the connecting segment 152 and the extension line of the second installation part 12 is 15°~160°, which can appropriately suppress the traction of the elastic support 10 caused by the rotational force, and further appropriately reduce the impact of the vertical vibration of the vibration unit 20 on the elastic support 10. Moreover, the arc segment 151 and the connecting segment 152 are respectively provided as a circular arc segment and a straight line segment, which is convenient for manufacture.

Figure 1:
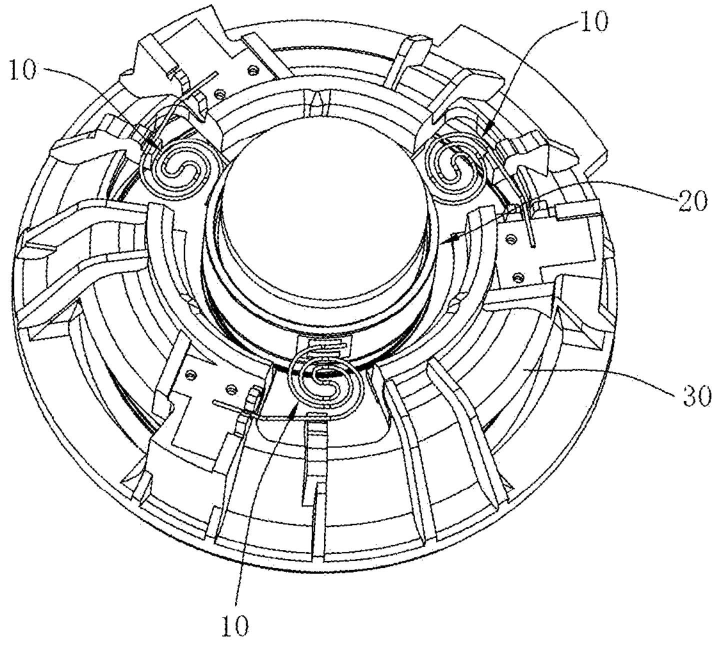
FIG. 1 is a perspective view of an electronic device according to an embodiment of the present invention.
Figure 2:
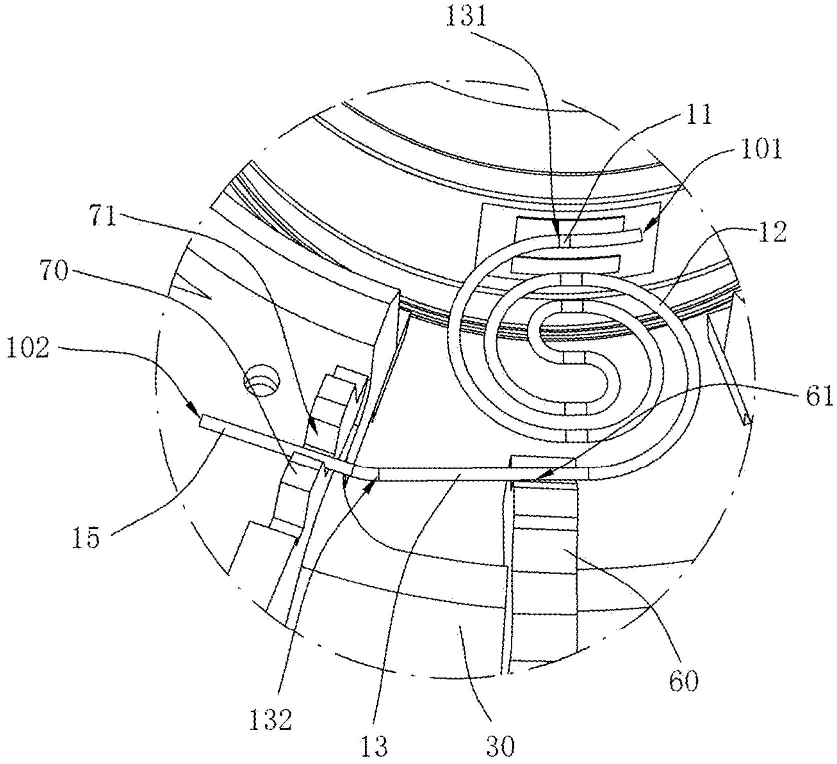
FIG. 2 is a partially enlarged view of an electronic device according to an embodiment of the present invention.
Figure 3:
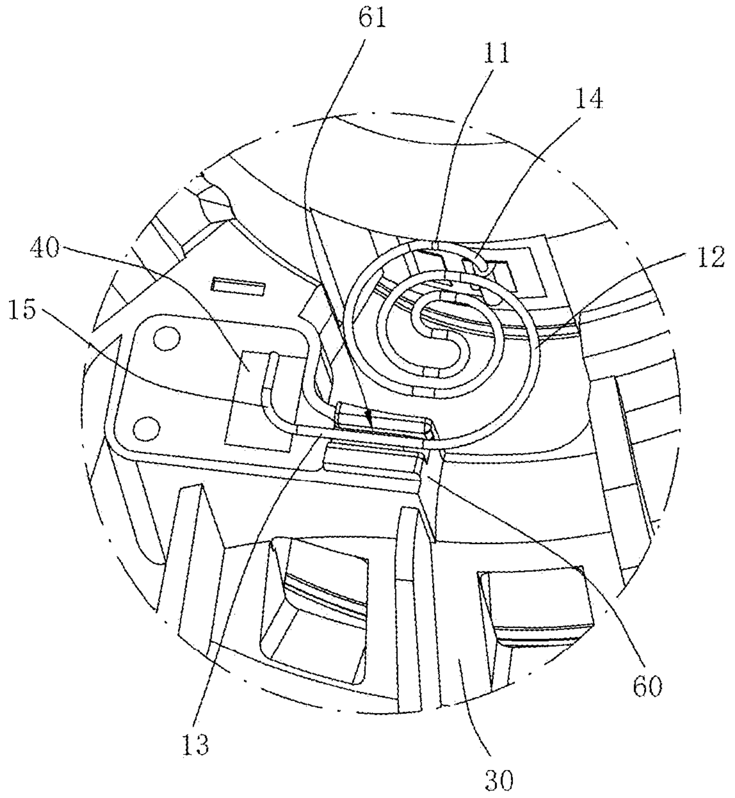
FIG. 3 is a partially enlarged view of an electronic device according to another embodiment of the present invention.

As shown in FIGS. 1 to 3, in the embodiment, a support block 70 is further provided on the bracket 30. The support block 70 is provided between the pad 40 and the cushioning block 60, and the second cushioning part 15 is supported by the support block 70. The setting of the supporting block 70 can support the second cushioning part 15 together with the cushioning block 60 to eliminate the resonance swing of the elastic support 10.

Further, the support block 70 is formed with a notch 71 with one side open and the other side closed. The notch 71 is formed on one side of the support block 70 away from the bracket 30, and the opening of the notch 71 faces away from the bracket 30. The second cushioning part 15 passes through the notch 71 and is supported by the closed side of the notch 71. As shown in FIGS. 1 to 3, the opening of the notch 71 is provided upward, that is, the open side of the notch 71 is the upper side, and the closed side is the lower side. The second cushioning part 15 can pass through the notch 71, and the notch 71 guides and supports the elastic support 10 and eliminates the resonance swing of the elastic support 10.

The elastic part 13 in the embodiment is a planar structure arranged along the second direction, and the elastic part 13 is located in the same horizontal plane as the first installation part 11 and the second installation part 12. The first direction and the second direction are perpendicular to each other. The second direction of the embodiment is the horizontal direction or the left and right direction as shown in FIG. 4, FIG. 6 and FIG. 7. The elastic part 13 is a planar structure arranged horizontally, and the elastic part 13 is located in the same horizontal plane as the first installation part 11 and the second installation part 12. That is to say, the elastic part 13 and the first installation part 11 and the second installation part 12 are all planar structures arranged horizontally. Compared with the existing damper of a corrugated sheet-shape, the overall flatness of the elastic support 10 is improved, the height of the electronic device along the vertical direction is further reduced, and the design concept of product miniaturization is realized.

As shown in FIG. 1 and FIG. 11, in the electronic device of the embodiment, there are at least two elastic supports 10, and at least two elastic supports 10 are evenly arranged at intervals along the outer circumference of the voice coil 21. In one embodiment, the number of elastic supports 10 is three, and the three elastic supports 10 are evenly arranged at intervals along the outer circumference of the vibration unit 20, which enhances the centering effect on the vibration unit 20. Specifically, at least three elastic supports 10 form at least three constraints on voice coil 21 in the horizontal direction during vertical vibration of vibration unit 20, which can restrain the polarization of the vibration unit 20. In addition, the elastic supports 10 displace in the vertical direction by following the vibration unit 20, enhancing the centering effect on the vibration unit 20. In other embodiments, the number of elastic supports 10 may be four, five, six or other numbers. The number of elastic supports 10 in the electronic device of the present invention can be adjusted flexibly according to actual conditions, and the present invention does not limit the number of elastic supports 10.

The electronic device can include at least one elastic group 50, and one elastic group 50 includes four elastic supports 10 located on the same horizontal plane. In the same elastic group 50, the line widths or materials of the four elastic supports 10 may be the same or different. For example, due to different material properties, among the four elastic supports 10, two of the elastic supports 10 are made of phosphor bronze, the line width can be 0.4 mm, one elastic support 10 is made of beryllium copper and its line width can be 0.3 mm, and another elastic support 10 is made of 316 steel and its line width can be 0.2 mm.

In addition, among four elastic supports 10 of the same elastic group 50, wherein two elastic supports 10 are conductive structures, and the other elastic supports 10 are non-conductive structures. The elastic supports 10 of the conductive structure have the function of conducting electricity, and can transmit electrical signals to the vibration unit 20 of the electronic device. Specifically, the elastic support 10 is electrically connected to and matched with the wiring part of the voice coil 21 of the vibration unit 20 by means of the first installation part 11, the second installation part 12 is connected to an external power source, so as to transmit the electrical signal between the voice coil 21 and the outside through the elastic support 10. In addition, the elastic support 10 constrains the reciprocating vibration of the vibration unit 20 based on the vibration displacement state of the vibration unit 20 through the elastic deformation effect of its elastic part 13, so that the vibration unit 20 is stabilized in the predetermined center section, the polarization of the vibration unit 20 is prevented, and the reciprocating vibration of the vibration unit 20 is more stable. Therefore, the elastic support 10 has both the functions of conduction and centering, and realizes the integration of the two functions. Only two elastic supports 10 provided in the electronic device of the present invention can simultaneously realize conduction effect on internal and external circuits and centering effect on vibration of vibration unit 20. The space in the cavity of the electronic device can be saved, to further facilitate miniaturization of the product, the assembly process of the electronic device can be effectively simplified.

The electronic device may include a plurality of elastic groups 50, such as two or three elastic groups 50. The plurality of elastic groups 50 are arranged at intervals along the height direction of the voice coil 21, and all elastic supports 10 of each elastic group 50 are located in the same horizontal plane. Taking two elastic groups 50 as an example for illustration, the two elastic groups 50 are arranged at intervals along the vertical direction of the vibration unit 20. Each group of elastic groups 50 includes four elastic supports 10, and the four elastic supports 10 are located on the same horizontal plane. The eight elastic supports 10 of the two elastic groups 50 are arranged in a staggered manner in vertical direction, which not only enhances the centering effect on the vibration unit 20, but also has good symmetry and flatness in the mechanical stiffness Kms, meeting the fatigue requirements for large displacements. Compared with one elastic group 50, the plurality of elastic groups 50 can enhance the centering effect on the vibration unit 20 on the one hand, and reduce stress concentration on the other hand, which can correspondingly reduce the line width of the elastic support 10, and facilitates manufacture thereof.

In the electronic device of the present invention, the number and arrangement of the elastic groups 50, as well as the shape, structure, line width, material, and properties of each elastic group 50 can be flexibly provided according to actual needs, with good compatibility and a wide range of applications.

The present invention also provides a terminal, which includes the above-mentioned electronic device. The terminal can be a computer, a mobile phone, a sound box, and a car sound box applied to a car. The terminal includes the above-mentioned electronic device, and the specific structure of the electronic device and its elastic support 10 refers to the above-mentioned embodiments. Since the terminal adopts all the technical solutions of all the above-mentioned embodiments, it has at least the advantages brought by the technical solutions of the above-mentioned embodiments, which will not be repeated here.

The above are only preferred embodiments of the present invention, and are not intended to limit the scope of the present invention. Under the inventive concept of the present invention, the equivalent structural transformation made by using the contents of the description and the accompanying drawings of the present invention, or directly/indirectly used in other all relevant technical fields is included in the protective scope of the present invention.

The invention claimed is:

1. An electronic device, comprising a vibration unit, a bracket, and an elastic support;

wherein a first end of the elastic support is connected to the vibration unit, and a second end of the elastic support is directly connected to the bracket, thereby counterbalancing reciprocating vibration of the vibration unit in a first direction;

wherein the bracket comprises a cushioning block thereon at a position corresponding to the elastic support, and the cushioning block is installed on a section of the elastic support close to the second end; and wherein the cushioning block is formed with a perforation, and the section of the elastic support close to the second end passes through and is installed in the perforation.

2. The electronic device according to claim 1, wherein the perforation is a groove structure with one side open and the other side closed, the groove structure is formed on one side of the cushioning block away from the bracket, and an opening of the groove structure faces away from the bracket.

3. The electronic device according to claim 2, wherein the section of the elastic support close to the second end is installed in the groove structure by a flexible cushioning.

4. The electronic device according to claim 3, wherein the flexible cushioning is an adhesive filled in the groove structure.

5. The electronic device according to claim 4, wherein a gap is formed between the section of the elastic support close to the second end and an inner wall of the groove structure, and the gap is filled by the adhesive.

6. The electronic device according to claim 1, wherein the elastic support comprises a first installation part, an elastic part, and a second installation part connected in sequence, the elastic part is in a polyline structure consisting of straight-lines and/or curved lines, one end of the first installation part away from the elastic part is the first end, and one end of the second installation part away from the elastic part is the second end, and the cushioning block includes a projective section thereof facing the elastic part and at least partially overlapping with the elastic part.

7. The electronic device according to claim 6, wherein the elastic part comprises a third end connected to the first installation part and a fourth end connected to the second installation part, the elastic part is formed by extending from the third end to the fourth end in straight lines and/or curved lines in the same direction or in different directions; and wherein a central section is provided between the third end and the fourth end, wherein the fourth end is provided right-opposite the central section, and the cushioning block extends from the fourth end to the second end.

8. The electronic device according to claim 6, wherein the first installation part is provided with a first cushioning part, at least part of the first cushioning part is bent from the first end toward the first direction; and/or, the second installation part is provided with a second cushioning part, the second cushioning part and the elastic part are located in the same horizontal plane, a direction of the plane where the elastic part is located is different from the first direction, and the second cushioning part is bent from the second end toward or away from the elastic part.

9. The electronic device according to claim 8, wherein the second cushioning part is formed as an arc segment, one end of the second cushioning part is connected to the vibration unit, and the other end of the second cushioning part is connected to the second installation part in a smooth transition; or, the second cushioning part includes a connecting segment and an arc segment, the connecting segment is connected to the vibration unit, and the connecting segment is connected to the second installation part in a smooth transition through the arc segment.

10. The electronic device according to claim 8, wherein the bracket is provided with a pad, and the second cushioning part is welded to the pad.

11. The electronic device according to claim 10, wherein a support block is further provided on the bracket, the support block is provided between the pad and the cushioning block, and the support block supports the second cushioning part.

12. The electronic device according to claim 11, wherein the support block is formed with a notch with one side open and the other side closed, the notch is formed on one side of the support block away from the bracket, and an opening of the notch faces away from the bracket; and the second cushioning part passes through the notch and is supported on a closed side of the notch.

13. The electronic device according to claim 8, wherein the elastic part is a planar structure arranged along the second direction, and the elastic part is located in the same horizontal plane as the first installation part and the second installation part, the first direction and the second direction are perpendicular to each other.

14. The electronic device according to claim 1, wherein the elastic support is formed by winding a wire-like structure; or, the elastic support is formed by stamping a sheet-like structure.

15. The electronic device according to claim 1, wherein a cross-section of a line segment of the elastic support is a closed loop structure formed by curved lines and/or straight lines.

16. The electronic device according to claim 1, wherein the vibration unit comprises a diaphragm and a voice coil connected to the diaphragm; the first end is connected to the voice coil; and/or the bracket is a housing or a magnetic yoke.

17. A terminal, comprising an electronic device according to claim 1.

* * * * *